Figure 1:
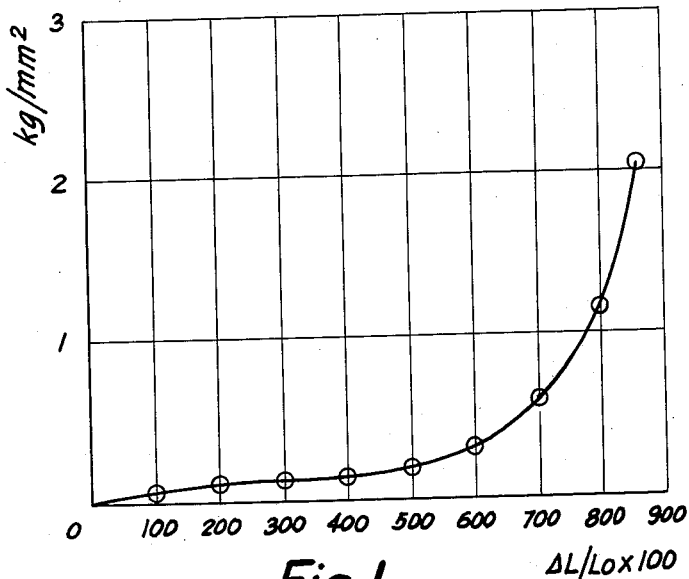

INVENTORS
GIULIO NATTA
LIDO PORRI
LEONARDO FIORE

BY Toulmin & Toulmin

ATTORNEYS

United States Patent Office 3,016,371
Patented Jan. 9, 1962

3,016,371
HOMOGENEOUS POLYMERIZATION CATALYSTS BASED ON COBALT, AND POLYMERIZATION OF DIOLEFINS THEREWITH
Giulio Natta, Lido Porri, and Leonardo Fiore, Milan, Italy, assignors to Montecatini Societa Generale per l'Industria Mineraria e Chimica, a corporation of Italy
Filed Feb. 20, 1959, Ser. No. 794,730
Claims priority, application Italy Feb. 26, 1958
8 Claims. (Cl. 260—94.3)

This invention relates to new polymerization catalysts based on cobalt compounds which are normally soluble in hydrocarbon solvents, and to processes for polymerizing butadiene therewith.

Natta et al. have described processes for polymerizing butadiene to polymers having prevailingly cis-1,4. Thus, the Natta et al. paper published in Gazz. Chim. Ital. 89,761, 1959, discloses the use of catalysts prepared from alkyl aluminum compounds and the needle-shaped brown form ($\beta$ form) of $TiCl_3$. It was shown that the last-mentioned catalyst exhibit, in the polymerization of diolefins, a stereospecificity which is different from that of catalysts prepared from the alkyl aluminum compounds and the violet form of $TiCl_3$.

The alpha-(violet) form of $TiCl_3$ has a layer structure which makes it comparable to a polymer $(TiCl_3)_n$ having a bi-dimensional structure similar to that of graphite and mica. The layer structure reesults from the presence of densely compacted titanium planes disposed between chlorine planes (as in a sandwich structure), which chlorine planes co-ordinate the titanium planes planarily.

The brown form, on the other hand, has a completely crystalline structure which can be considered as consisting of a linear polymer made of chains of titanium atoms in which each atom is bound to the succeeding atom by three closely co-ordinated chlorine bridges.

The stereospecific catalysts prepared from the alpha-form of $TiCl_3$ polymerize butadiene to polymers containing macromolecules having practically exclusively the trans-1,4 structure. The stereospecific catalysts prepared from the $\beta$- or brown form of $TiCl_3$, on the contrary, yield butadiene polymers having the 1,4-enchainment but which have a high content of cis-1,4 structure.

It has been proposed by the Natta group to use other titanium compounds as components of catalysts for polymerizing butadiene to polymers rich in cis-1,4 structure. Catalysts based on normally hydrocarbon-insoluble dihalides or other compounds of cobalt have been disclosed in Italian Patents Nos. 592,477 and 588,825 for use in polymerizing butadiene to the polymers having the high content of cis-1,4 structure. Italian Patents Nos. 587,-968, 594,618, and 597,678 disclose that butadiene can be polymerized to polymers predominantly of cis-1,4 structure, using homogeneous catalysts based on the normally hydrocarbon-insoluble cobalt dihalides, etc. but in which the cobalt is complexed with pyridine or other similar organic base, which complexes are soluble in benzene.

While the various types of catalysts mentioned yield butadiene polymers rich in units having cis-1,4 structure, in some cases the content of cis-1,4 structure is not sufficient to render the polymers capable of crystallizing under cooling to a temperature below room temperature, or under stretching at room temperature.

Both the heterogeneous catalysts prepared from the cobalt dihalides, and the homogeneous catalysts in which the cobalt salt is complexed with, and solubilized by, an organic base, yield polymers having a very high content of cis-1,4 structure and which crystallize under stretching at room temperature. However, those catalysts tend to give only moderate yields of polymer, based on the weight of catalyst used, and, therefore, the polymer contains relatively large amounts of inorganic residues the elimination of which presents some difficulty.

The catalysts comprising the cobalt compounds complexed with, specifically, a pyridine base do not have the foregoing disadvantage but are soluble only in benzene, a solvent which tends to swell the polybutadiene and is, therefore, difficult to remove. More volatile solvents which can be removed readily from the polymerization mass and recycled cannot be used with those catalysts comprising the pyridine complexes.

One object of this invention is to provide new catalysts based on cobalt and which can be used for polymerizing butadiene, in a variety of aliphatic and aromatic hydrocarbon solvents, or in the liquid butadiene in the absence of extraneous solvents, to polymers having a high content of cis-1,4 structure, and which are crystallizable.

That and other objects are accomplished by the present invention according to which we find that compounds of the type $Co(NO)_2Cl$ which have a needle structure similar to that of the $\beta$-form $TiCl_3$ and contain linear chains of cobalt atoms, when combined with organometallic compounds of elements of Groups II to III, inclusive, of the Mendeléeff Periodic Table, yield catalysts capable of polymerizing butadiene to polymers consisting practically exclusively of cis-1,4 units and crystallizable under stretching at room temperature.

The cobalt compounds of the type of $Co(NO)_2Cl$ are slightly soluble in either aromatic or aliphatic hydrocarbons, and when reacted with, e.g., dialkyl aluminum monohalides, such as diethyl aluminum monochloride, yield catalysts which are both homogeneous and soluble in the hydrocarbons.

For instance, dinitrosyl cobalt monochloride is soluble in hydrocarbons having a low boiling point, such as propane and butane, and yields, with the dialkyl aluminum monohalide, catalysts that are also soluble in, e.g., propane and butane. Those solvents can be used as the polymerization medium, therefore, and at the end of the polymerization reaction are easily recovered by distillation at room temperature, thus presenting a remarkable advantage from the standpoint of economy.

The polymerization can be carried out without the use of any extraneous solvent, the butadiene itself, in the liquid state, serving as the solvent for the catalyst.

The practical advantages to be gained by employing the new catalysts of this invention will be self-evident.

Only very small amounts of the normally hydrocarbon-soluble cobalt compounds are required in preparing the present catalysts. This is particularly true in respect to dinitrosyl cobalt chloride.

In fact, we find, as another feature of our invention, that the lower the concentration of dinitrosyl cobalt chloride used in the solvent selected as the polymerization medium, the higher is the content of cis-1,4 units in the butadiene polymer produced. This is especially noticeable when aliphatic hydrocarbons are used as the polymerization solvents.

The influence of the concentration of, e.g., dinitrosyl cobalt monochloride in the polymerization solvent on the stereospecific composition of the polymer is shown in the examples given below.

In general we have found that, to obtain polymers containing more than 95% cis-1,4-enchained units, it is advantageous to use an amount of $Co(NO)_2Cl$, generally in the range of 0.010 g. (0.07 millimol) per liter of solvent to 0.030 g. (0.2 millimol) per liter of solvent, especially when an aliphatic hydrocarbon solvent is used.

In order to use such small amounts of the catalyst successfully, however, it is necessary to use pure reagents, and both the solvent and the butadiene must be absolutely anhydrous and free of dissolved oxygen.

With butadiene of particularly high purity, even smaller amounts of cobalt compounds could be used.

The preferred organometallic compound used in preparing the catalyst is dialkyl aluminum monohalide, but organometallic compounds of other elements of Groups II to III inclusive of the Mendeléeff Periodic Table, such as Be, Zn, Mg, Cd can also be employed, particularly alkyl compounds of the elements in which the alkyl groups contain from 1 to 5 carbon atoms.

The molar ratio of the alkyl compound of the element to cobalt dinitrosyl monohalide does not have a marked influence on the characteristics of the polymer produced. Such ratio can vary between a value of about 10 to a value above 100.

Since cobalt dinitrosyl chloride is extremely sensitive to humidity and air, and as very small amounts of that material are generally used in preparing the catalyst, it is advisable to prepare the catalyst by mixing the reactants in the following order: first add the alkyl metal compound to the solvent, which removes any traces of moisture present, then add the cobalt compound, in the solid state or, preferably, as a solution in the selected polymerization solvent, and finally add the butadiene to be polymerized to the system.

Using catalysts according to the present invention, we obtain butadiene polymers containing more than 95% of cis-1,4 units.

The percent cis-structure in the polymerizate is determined by infra-red analysis, on the solid polymer in the form of laminae. The optical densities were determined according to the base line method at 10.36 microns for the trans-unsaturation, at 11.00 microns for the vinyl unsaturation, and at 13.60 microns for the cis-unsaturation. The coefficients of apparent molecular extinction used were 10, 6, and 12 for the trans-1,4, cis-1,4 and 1,2 bonds, respectively.

The polymers produced by the present method, and which contain more than 94% of cis-1,4 units exhibit a high degree of crystallinity in the stretched state at room temperature, and even in the unstretched state at lower temperature. The melting point of the polybutadiene in the unstretched state depends on the stereoisomeric purity of the polymer and, for the completely pure product, it is about 0° C. Products containing less than 90% cis-content have a markedly lower melting point.

The polymers having a very high content of cis-1,4 units can be vulcanized by the processes, and using the vulcanizing aids, normally used for vulcanizing natural rubber.

The products obtained by vulcanizing the butadiene polymers containing at least 95% of cis-1,4 units produced according to the present method, have tensile strengths corresponding approximately to those of natural rubber. In contrast, the vulcanizates obtained from the polymers containing less than 90% of cis-1,4 units have a low tensile strength.

As an illustration of the vulcanization of these polymers, the polybutadiene obtained according to Example 3 below was vulcanized at 150° C. for 30 minutes, using the following mix:

| | Parts |
|---|---|
| Polymer | 100 |
| Phenyl-β-naphthylamine | 1 |
| S | 0.5–1 |
| ZnO | 3 |
| Stearic acid | 2 |
| Mercaptobenzothiazole | 1 |

The stress-elongation curve for the vulcanized product obtained as described is shown in FIGURE 1 of the drawing and is practically the same as the characteristic curve for natural rubber vulcanized in the same way.

The vulcanized polymer has a tensile strength as high as 2 kg./mm.$^2$, and an elongation at break of 800% (determined according to ASTM D412–51, type D specimens, with a rate of separation of the grips of 50 mm./minute).

A polybutadiene obtained according to Example 3 below was also mixed with the following ingredients and then vulcanized by heating at 160° C. for 45 minutes:

| | Parts |
|---|---|
| Polymer | 100 |
| Phenyl-β-naphthylamine | 1 |
| Stearic acid | 1 |
| ZnO | 5 |
| EPC carbon black | 40 |
| Mercaptobenzothiazole | 0.8 |
| Diphenyl guanidine | 0.5 |
| Sulfur | 0.5 |

Figure 2:
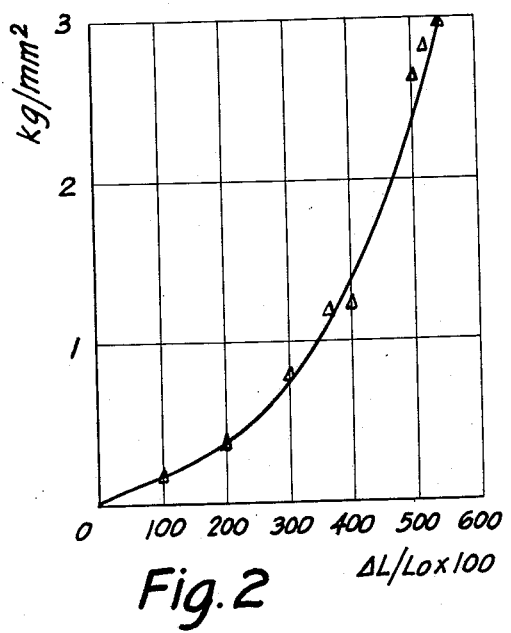

The stress-elongation curve for the vulcanizate thus obtained is shown in FIGURE 2 of the drawing.

The products obtained by vulcanizing the polymers obtained according to Examples 1 and 2 are rubbers the mechanical characteristics of which have values (tensile strength of about 0.5 kg./mm.$^2$) lower than for the characteristics of the vulcanized products obtained from the polymer produced as described in Example 4. This is evidence of the influence of the stereoisomeric purity of the polymers on the characteristics of the vulcanized products obtained from them. The cis-1,4 content for the polymers of Examples 1 and 2, respectively, is 81% and 88%, whereas the cis-1,4 content of the polybutadiene of Example 3 is 95.3%.

The following examples are given to illustrate the invention, it being understood that these examples are not intended as limiting.

*Example 1*

The following ingredients are introduced into a 250 cc. flask, provided with a leak-proof stirrer and from which air has been removed and replaced by nitrogen:

| | | |
|---|---|---|
| n-Heptane | cc. | 100 |
| Diethyl aluminum monochloride | cc. | 0.4 |
| Dinitrosyl cobalt monochloride | g. | 0.01 |

When the cobalt compound is completely dissolved, 99% butadiene is bubbled through the solution at such a flow rate that it is absorbed completely. The temperature of the reaction liquid, which tends to rise, is kept at 10–15° C. by outside cooling.

After about 20 minutes, the reaction mass becomes a rubbery solid which can no longer be stirred. The reaction is then stopped by introducing 50 cc. methanol. In total, 50 g. butadiene have been added.

The product obtained is coagulated with a methanol-hydrochloric acid solution, is carefully washed with methanol, and finally vacuum dried at room temperature.

22 g. of a solid polymer having the following characteristics are obtained.

Infra-red examination:

| | Percent |
|---|---|
| Trans-1,4 | 11 |
| Cis-1,4 | 81 |
| 1,2 | 7.5 |

*Example 2*

Into a 250 cc. flask, provided with a stirrer, and from which air has previously been removed and replaced by nitrogen, 100 cc. anhydrous n-heptane are introduced, followed by 0.2 cc. diethyl aluminum monochloride and finally 0.005 g. dinitrosyl cobalt monochloride.

After stirring the mass for a few minutes, about 20 g. 99% butadiene are bubbled through the catalyst solution within 30 minutes, while the reaction temperature is kept at between 10° C. and 15° C.

The polymerization is stopped by pouring 50 cc. methanol into the flask, and the product obtained is coagulated and purified with methanol as dsecribed in Example 1.

After vacuum drying at room temperature, 11 g. of a solid polymer are obtained. By infra-red examination, it is found to have the following composition:

| | Percent |
|---|---|
| Cis-1,4 | 88 |
| Trans-1,4 | 6.5 |
| 1,2 | 5.5 |

Example 3

Into apparatus as described in the preceding examples, there are introduced, in the order given:

100 cc. n-heptane
0.10 cc. diethyl aluminum monochloride
0.001 g. dinitrosyl cobalt monochloride After stirring for a few minutes, 20 g. 98% butadiene are introduced within 20 minutes, while the reacting mass is kept at between 10° C. and 20° C. The catalyst is decomposed by introducing 50 cc. methanol into the flask. The purified and coagulated polymer amounts to 10.5 g.

By infra-red examination, it is shown to have the following composition:

| | Percent |
|---|---|
| Cis-1,4 | 95.3 |
| Trans-1,4 | 2.2 |
| 1,2 | 2.5 |

Example 4

Into apparatus as described in the preceding examples, 100 cc. benzene, 0.1 cc. Al(C$_2$H$_5$)$_2$Cl, and finally 0.0015 g. Co(NO)$_2$Cl are introduced in the order stated. When the cobalt compound is completely dissolved, 99% butadiene is introduced at such a flow rate that it is absorbed completely. The reaction temperature is kept at between 10° C. and 20° C. After 20 minutes, about 16 g. butadiene have been added and the mass in the flask becomes thick. The reaction is then stopped by introducing 50 cc. methanol.

The polymer is coagulated and purified with methanol as in Example 1.

11.1 g. of a dry solid polymer, which by infra-red examination shows the following composition, are obtained:

| | Percent |
|---|---|
| Cis-1,4 | 94.5 |
| Trans-1,4 | 2 |
| 1,2 | 3.5 |

Intrinsic viscosity in toluene at 30°C. =4.17 cc./g.

Instead of dinitrosyl cobalt monochloride, other monohalides of the substituted cobalt may be used, including the mono-bromide and mono-iodide, in preparing the catalyst.

Example 5

Into the same apparatus 100 cc. anhydrous benzene, 0.25 cc. Al(C$_2$H$_5$)$_2$Cl and finally 0.002 g. Co(NO$_2$)Br are introduced in the order.

Butadiene of 99% purity is polymerized with the catalyst solution thus obtained, operating at between 10° and 15° C. After 45', about 22 g. butadiene have been added and the mass becomes very viscous. The reaction is stopped and 7.5 g. dry polymer are recovered, which by infrared examination shows the following composition:

| | Percent |
|---|---|
| Cis-1,4 | 94 |
| Trans-1,4 | 2.8 |
| 1,2 | 3.2 |

The foregoing examples clearly demonstrate the effectiveness of the catalysts based on the hydrocarbon-soluble cobalt compounds in orienting the polymerization of butadiene to the production of polymers having a high content of cis-1,4 structure and high stereoisomeric purity. It will be apparent that some changes in the details given can be made in practice without departing from the spirit of our invention and, therefore, we intend to include in the scope of the appended claims all such modifications and variations as may be apparent to those skilled in the art from the description and examples given.

What is claimed is:

1. A homogeneous polymerization catalyst consisting essentially of a dinitrosyl cobalt monohalide and an alkyl halide of an element belonging to Groups II to III, inclusive of the Mendeléeff Periodic Table.

2. A homogeneous polymerization catalyst consisting essentially of dinitrosyl cobalt monochloride and dialkyl aluminum chloride.

3. A homogeneous polymerization catalyst consisting essentially of a solution of dinitrosyl cobalt monochloride and dialkyl aluminum chloride in a hydrocarbon solvent.

4. A homogeneous polymerization catalyst consisting essentially of a solution of dinitrosyl cobalt monochloride and dialkyl aluminum chloride in an aliphatic hydrocarbon solvent.

5. A homogeneous polymerization catalyst consisting essentially of a solution of dinitrosyl cobalt monochloride and dialkyl aluminum chloride in an aromatic hydrocarbon solvent.

6. A homogeneous polymerization catalyst consisting essentially of a hydrocarbon solvent having dissolved therein a dialkyl aluminum chloride and, per liter of the solvent, from less than 0.1 millimol up to about 0.2 millimol of a dinitrosyl cobalt monohalide.

7. A process for polymerizing butadiene to polymers having substantially cis-1,4 structure, which process comprises bringing butadiene into intimate contact with a homogeneous polymerization catalyst consisting essentially of a dinitrosyl cobalt monohalide and a dialkyl aluminum chloride, and recovering the resulting polymerizate.

8. A process for polymerizing butadiene to polymers having substantially cis-1,4 structure, which process comprises bringing butadiene into intimate contact with a homogeneous polymerization catalyst consisting essentially of a solution of dinitrosyl cobalt monohalide and a dialkyl aluminum chloride, in a hydrocarbon solvent, and recovering the resulting polymerizate.

No references cited.